T. F. MURPHY.
LAWN TRIMMER.
APPLICATION FILED DEC. 7, 1916.
1,314,535.
Patented Sept. 2, 1919.
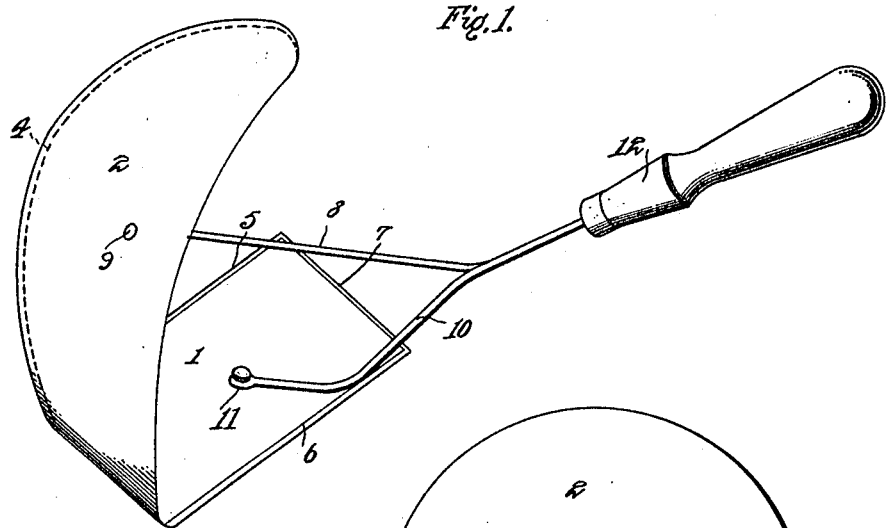
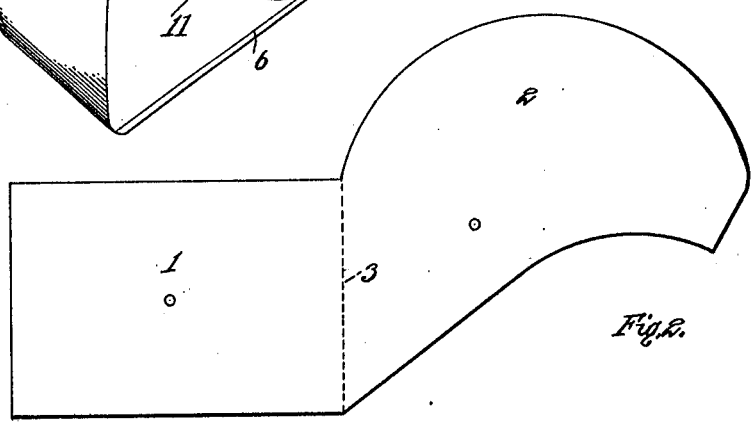
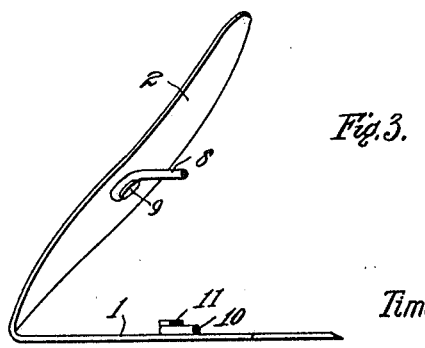
INVENTOR
Timothy F. Murphy.
WITNESSES
BY
ATTORNEY

UNITED STATES PATENT OFFICE.

TIMOTHY F. MURPHY, OF BEACON, NEW YORK, ASSIGNOR OF ONE-HALF TO DE FORREST MONTGOMERY, OF BEACON, NEW YORK.

LAWN-TRIMMER.

1,314,535.  Specification of Letters Patent.  Patented Sept. 2, 1919.

Application filed December 7, 1916. Serial No. 135,658.

*To all whom it may concern:*

Be it known that I, TIMOTHY F. MURPHY, a citizen of the United States, residing at Beacon, in the county of Dutchess and State of New York, have invented certain new and useful Improvements in Lawn-Trimmers, of which the following is a specification.

This invention relates to lawn trimmers, and more particularly to a trimmer provided with means for cutting or trimming the edges of a lawn bordering a walk, in combination with means for removing the grass which has been cut away from the lawn edge.

One of the main objects of the invention is to provide a device of the character stated of simple construction and of high efficiency. A further object is to provide a device which can be produced at relatively small cost. Further objects will appear from the detailed description.

In the drawings:

Figure 1 is a perspective side view of the invention;

Fig. 2 is a detail plan view of a blank from which the trimmer is made; and

Fig. 3 is a back view of the invention.

In carrying my invention into effect I stamp a blank having a rectangular portion 1 and an integral arcuate portion 2. I then bend this blank along the line 3 indicated by the broken lines in Fig. 2 of the drawings, so as to have the members 1 and 2 disposed at an acute angle to each other. The member 2 is then sharpened to produce an arcuate cutting edge 4 such as is commonly employed in lawn trimmers of ordinary construction. The member 1 has its front edge sharpened as at 5 to produce a front cutting edge, and also has its back edge 6 sharpened, and its end 7 sharpened. This provides a rectangular blade which corresponds to the blade of the ordinary scuffle hoe.

A rod 8 is riveted at one end, as at 9, to the arcuate blade 2, and a rod 10 is riveted at 11 to the rectangular blade 1, the outer ends of these two rods being brought together and secured in a suitable handle 12. This provides an implement which may be considered as a combination of a lawn trimmer having an arcuate blade and a scuffle hoe provided with a rectangular blade.

In using my device the blade 2 will be employed in the ordinary manner to cut or trim along the edge of the lawn, the scuffle blade 1 being used to uproot and remove the grass which has been separated from the lawn by the blade 2. By this means the edges of a lawn may be quickly and easily trimmed so as to present a neat appearance, the necessity for employing two or more separate implements being done away with.

There may be slight changes made in the construction and arrangement of the different parts of my invention without departing from the field and scope of the same, and I intend to include all such changes, as fall within the scope of the appended claim, in this application in which a preferred form only of my invention is disclosed.

What I claim is:

A lawn trimmer including a one piece body portion comprising a rectangular blade having side edges and one end edge beveled and sharpened, a wing blade positioned at an acute angle to and formed on one end of said rectangular blade of arcuate configuration having one edge formed with a semicircular curve which is beveled and sharpened and forms a continuation of one side edge of the rectangular blade and extends in advance thereof, and the other edge forming a continuation of the other side edge of the rectangular blade disposed at an angle thereto and extending in a rectilinear direction for a portion of its length, terminating in a semicircular curve, a bifurcated rod having its members diverging, means for connecting one member to the center of the rectangular blade, and means for connecting the other member to the arcuate blade at a point adjacent its rectilinear edge.

In testimony whereof I affix my signature in presence of two witnesses.

TIMOTHY F. MURPHY.

Witnesses:
ANNA O'BRIEN,
JOHN J. DONNELLY.

Copies of this patent may be obtained for five cents each, by addressing the "Commissioner of Patents, Washington, D. C."